A. BOISAUBIN.
TOBACCO PIPE.
APPLICATION FILED APR. 29, 1908.
908,940.
Patented Jan. 5, 1909.
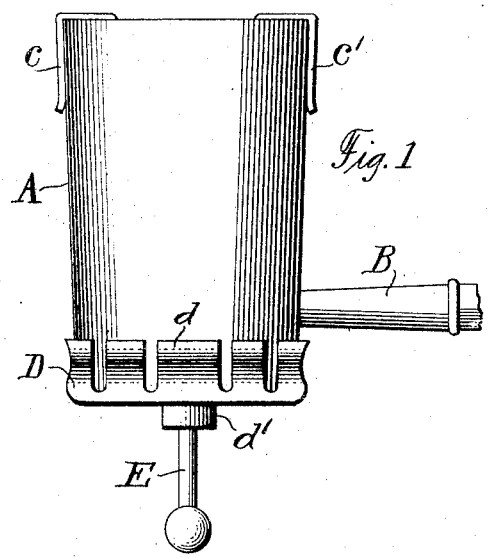
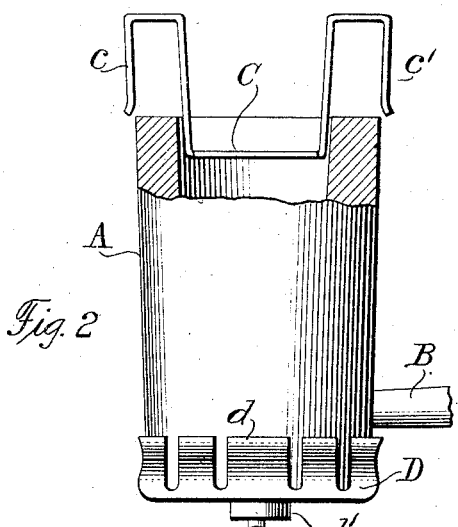
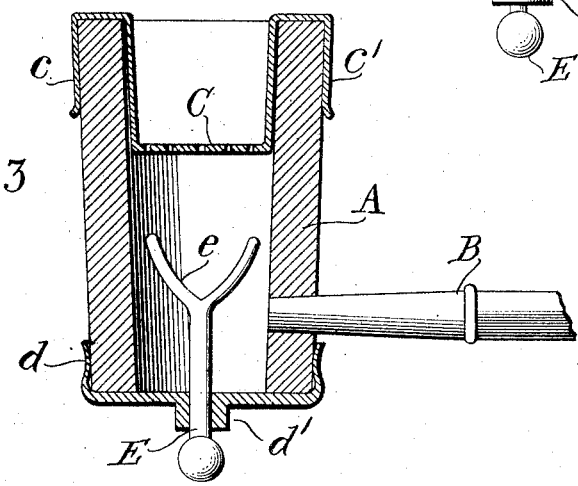
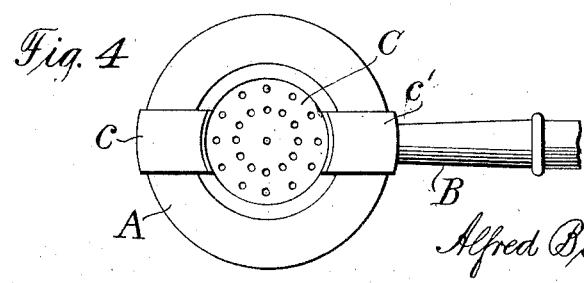
Witnesses
Jos. F. Collins
R. C. Balinger.
Inventor
Alfred Boisaubin,
By Edwin Guthrie,
Attorney

UNITED STATES PATENT OFFICE.

ALFRED BOISAUBIN, OF FLATBUSH, NEW YORK.

TOBACCO-PIPE.

No. 908,940.  Specification of Letters Patent.  Patented Jan. 5, 1909.

Application filed April 29, 1908. Serial No. 429,799.

*To all whom it may concern:*

Be it known that I, ALFRED BOISAUBIN, a citizen of the United States, residing at Flatbush, in the county of Kings and State of New York, have invented certain new and useful Improvements in Tobacco-Pipes, of which the following is a specification.

This invention relates to tobacco pipes, and has for its object the production of a pipe having a bowl provided with a removable bottom and top, in order that the bowl may be easily and quickly cleaned, and the devices for closing the bottom and top of the bowl are of special construction and arrangement, which is likewise an object of this invention.

The stated object is attained by fashioning and associating parts as illustrated in the accompanying drawings of which—

Figure 1 represents a side view of all parts assembled. Fig. 2 is a similar side view, the bowl being broken away to enable the raised position of the tamper to be shown. Fig. 3 is a vertical section of the bowl showing the tamper in its lowest position and the stirrer in its highest position. Fig. 4 is a top plan view.

Like reference letters are used to designate the same parts in the description and drawings.

The bowl A has, as illustrated, no bottom of its own.

The stem of the pipe is referred to by the letter B.

The perforated tamper plate C is provided at the sides with spring arms $c$ and $c'$ which engage the wall of the bowl as shown, and hold the tamper at any height within the bowl for which it is adapted. As the plate is perforated, the air may be drawn through it, and as the tobacco is consumed the plate is pressed downwardly by placing the fingers upon the tops or bends of the arms $c$ and $c'$ and the contents of the bowl are tamped down as much as desired. The plate C also performs the usual function of preventing the ignited tobacco from being blown out of the bowl when the pipe is used out of doors and exposed to the wind.

The closure for the bottom of the bowl is a metal pan D provided with upwardly-extending spring fingers $d$ that grasp the wall of the bowl exteriorly and thus retain the pan D in position. The bottom closure or pan D has upon its lower surface the raised center $d'$, and through the center $d'$ the rod of the stirrer E passes movably, and is terminated within the bowl by the prong $e$. The stirrer may be raised and lowered or turned upon its axis with corresponding movement of the prong $e$ within the bowl, and the tobacco may thus be properly loosened for free burning as often as necessary.

Having now described my invention, and explained the mode of its operation, what I claim is—

1. In a tobacco pipe, a bottomless bowl, a closure for the bottom of the bowl comprising a pan having vertical spring fingers adapted to engage the wall of the bowl and to hold the pan in place, the said closure constituting the sole bottom for the bowl and being bodily removable therefrom, and a stirrer passing through the closure into the bowl and movable lengthwise and rotatively, substantially as described.

2. In a tobacco pipe, a bottomless bowl, a tamper and means for securing the tamper removably to the bowl, and a removable closure constituting the sole bottom of the bowl comprising a pan having vertical spring fingers adapted to engage the wall of the bowl and to hold the pan in place, the said pan having a stirrer passing vertically through it into the bowl whereby the tobacco may be loosened in the bowl, substantially as described.

3. In a tobacco pipe, a bowl, and a tamper constructed to fit the interior of the bowl movably and comprising a perforated plate arranged within the bowl provided with inverted U-shaped arms having surfaces corresponding in curvature to the interior and exterior of the bowl and adapted to clasp the wall of the bowl and hold the plate in position at different heights within the bowl, substantially as described.

In testimony whereof I affix my signature in presence of two witnesses.

ALFRED BOISAUBIN.

Witnesses:
FRANK M. BLAU,
HOWARD K. MACKENZIE.